(12) United States Patent
Blackburn

(10) Patent No.: US 7,123,584 B2
(45) Date of Patent: *Oct. 17, 2006

(54) DIGITAL SUBSCRIBER LINE USER CAPACITY ESTIMATION

(75) Inventor: Stuart Lynch Blackburn, San Ramon, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/842,842

(22) Filed: May 11, 2004

(65) Prior Publication Data

US 2005/0163057 A1   Jul. 28, 2005

Related U.S. Application Data

(63) Continuation-in-part of application No. 10/766,314, filed on Jan. 28, 2004.

(51) Int. Cl.
*H04L 12/28* (2006.01)
(52) U.S. Cl. ............... 370/233; 370/234; 370/252; 370/253; 370/395.21
(58) Field of Classification Search ............... 370/230, 370/232, 233, 234, 235, 253, 254, 230.1, 370/395.21, 395.4
See application file for complete search history.

(56) References Cited

U.S. PATENT DOCUMENTS

| | | | |
|---|---|---|---|
| 5,280,483 A * | 1/1994 | Kamoi et al. ............... | 370/234 |
| 5,751,338 A | 5/1998 | Ludwig, Jr. | |
| 5,764,961 A * | 6/1998 | Bhat ............... | 703/21 |
| 5,974,139 A | 10/1999 | McNamara et al. | |
| 5,987,061 A | 11/1999 | Chen | |
| 6,044,107 A | 3/2000 | Gatherer et al. | |
| 6,055,268 A | 4/2000 | Timm et al. | |
| 6,081,291 A | 6/2000 | Ludwig, Jr. | |
| 6,292,559 B1 | 9/2001 | Gaikwad et al. | |
| 6,317,495 B1 | 11/2001 | Gaikwad et al. | |
| 6,424,657 B1 * | 7/2002 | Voit et al. ............... | 370/412 |
| 6,466,088 B1 | 10/2002 | Rezvani et al. | |
| 6,467,092 B1 | 10/2002 | Geile et al. | |
| 6,477,238 B1 | 11/2002 | Schneider et al. | |

(Continued)

OTHER PUBLICATIONS

International Telecommunication Union, "Series G:Transmission Systems and Media, Digital Systems and Networks. Digital Sections and Digital Line System-Access Networks. Asymetric Digital Subscriber Line (ADSL) Transceivers- 2(ADSL2)," G.992.3, ITU-T. Jul. 2002, pp. 1-127.

*Primary Examiner*—Seema S. Rao
*Assistant Examiner*—Shick Hom
(74) *Attorney, Agent, or Firm*—Toler Schaffer, LLP

(57) ABSTRACT

In a particular embodiment, the present disclosure is directed to a data communications system. The data communication system includes a plurality of digital subscriber lines, a digital subscriber line multiplexer coupled to each of the plurality of digital subscriber lines, and a data switch coupled to the digital subscriber line multiplexer via a communication link. The data communications system is configured such that the number of digital subscriber line users supported by the digital subscriber line multiplexer is determined based on an estimated maximum number of users, the estimated maximum number of users determined based on an average peak bandwidth per user value, a data communication capacity of the communication link, and a data transmission slowdown indicator. The communication capacity is based on a user type selected from a set of available user types.

24 Claims, 5 Drawing Sheets

U.S. PATENT DOCUMENTS

| | | | |
|---|---|---|---|
| 6,498,791 B1 | 12/2002 | Pickett et al. | |
| 6,507,606 B1 | 1/2003 | Shenoi et al. | |
| 6,532,277 B1 | 3/2003 | Ulanskas et al. | |
| 6,538,451 B1 | 3/2003 | Galli et al. | |
| 6,549,568 B1 | 4/2003 | Bingel | |
| 6,570,855 B1 * | 5/2003 | Kung et al. | 370/237 |
| 6,597,689 B1 | 7/2003 | Chiu et al. | |
| 6,608,835 B1 | 8/2003 | Geile et al. | |
| 6,614,781 B1 | 9/2003 | Elliott et al. | |
| 6,625,255 B1 | 9/2003 | Green et al. | |
| 6,640,239 B1 | 10/2003 | Gidwani | |
| 6,643,266 B1 | 11/2003 | Pugaczewski | |
| 6,658,052 B1 | 12/2003 | Krinsky et al. | |
| 6,667,971 B1 | 12/2003 | Modarressi et al. | |
| 6,668,041 B1 | 12/2003 | Kamali et al. | |
| 6,674,725 B1 | 1/2004 | Nabkel et al. | |
| 6,674,749 B1 | 1/2004 | Mattathil | |
| 6,680,940 B1 | 1/2004 | Lewin et al. | |
| 6,697,768 B1 | 2/2004 | Jones et al. | |
| 6,700,927 B1 | 3/2004 | Esliger et al. | |
| 6,724,859 B1 | 4/2004 | Galli | |
| 6,728,238 B1 | 4/2004 | Long et al. | |
| 6,731,678 B1 | 5/2004 | White et al. | |
| 6,735,601 B1 | 5/2004 | Subrahmanyam | |
| 6,751,218 B1 | 6/2004 | Hagirahim et al. | |
| 6,751,315 B1 | 6/2004 | Liu et al. | |
| 6,751,662 B1 | 6/2004 | Nararajan et al. | |
| 6,754,283 B1 | 6/2004 | Li | |
| 6,762,992 B1 | 7/2004 | Lemieux | |
| 6,763,025 B1 | 7/2004 | Leatherbury et al. | |
| 6,765,864 B1 | 7/2004 | Natarajan et al. | |
| 6,765,918 B1 | 7/2004 | Dixon et al. | |
| 6,769,000 B1 | 7/2004 | Akhtar et al. | |
| 6,769,024 B1 | 7/2004 | Natarajan et al. | |
| 6,771,673 B1 | 8/2004 | Baum et al. | |
| 6,775,232 B1 | 8/2004 | Ah Sue et al. | |
| 6,775,267 B1 | 8/2004 | Kung et al. | |
| 6,775,268 B1 | 8/2004 | Wang et al. | |
| 6,775,273 B1 | 8/2004 | Kung et al. | |
| 6,778,525 B1 | 8/2004 | Baum et al. | |
| 6,782,082 B1 | 8/2004 | Rahamim | |
| 6,925,068 B1 * | 8/2005 | Stanwood et al. | 370/329 |
| 6,963,828 B1 * | 11/2005 | McDonald et al. | 703/22 |
| 6,965,558 B1 * | 11/2005 | Hann | 370/216 |
| 2002/0075844 A1 * | 6/2002 | Hagen | 370/351 |
| 2003/0169460 A1 * | 9/2003 | Liao et al. | 358/426.08 |
| 2004/0095921 A1 | 5/2004 | Kerpez | |
| 2004/0236547 A1 * | 11/2004 | Rappaport et al. | 703/2 |
| 2005/0135490 A1 * | 6/2005 | Zimler et al. | 375/257 |

* cited by examiner

DIGITAL SUBSCRIBER LINE USER CAPACITY ESTIMATION

RELATED APPLICATIONS

The present application claims priority from and is a continuation in part of patent application Ser. No. 10/766,314 filed on Jan. 28, 2004.

FIELD OF THE DISCLOSURE

The present disclosure generally relates to data communication systems and methods of configuring a data network based on user capacity estimation techniques.

BACKGROUND OF THE DISCLOSURE

Telecommunications providers of data services, such as digital subscriber line (DSL) service, utilize concentration equipment that support many individual lines. To configure such equipment in a manner to match the data needs of the subscribers connected thereto, it would be desirable to have a data transmission capacity model. With conventional methods, there is no good method of estimating the number of customers that can be served by a remote terminal or a digital subscriber line access multiplexer (DSLAM). A limiting factor in capacity is the connection between the remote terminal or the DSLAM and the ATM switch. Typically this connection is an OC3 or DS3 connection. In the event that the equipment is configured above a reasonable capacity, then customers receive a lower quality service and experience significant data slowdown.

Accordingly, there is a need for a method and system to estimate the number of customers that can be supported on deployed network equipment.

DETAILED DESCRIPTION OF THE DRAWINGS

In a particular embodiment, the present disclosure is directed to a data communications system. The data communication system includes a plurality of digital subscriber lines, a digital subscriber line multiplexer coupled to each of the plurality of digital subscriber lines, and a data switch coupled to the digital subscriber line multiplexer via a communication link. The data communications system is configured such that the number of digital subscriber line users supported by the digital subscriber line multiplexer is determined based on an estimated maximum number of users, the estimated maximum number of users determined based on an average peak bandwidth per user value, a data communication capacity of the communication link, and a data transmission slowdown indicator. The communication capacity is based on a user type selected from a set of available user types. In a particular embodiment, the estimated maximum number of users of digital subscriber lines is calculated with an assumption that a first set of users of the first user type download data at the same data transfer speed and a second set of user having a second user type download data at a different data transfer speed.

Figure 1:
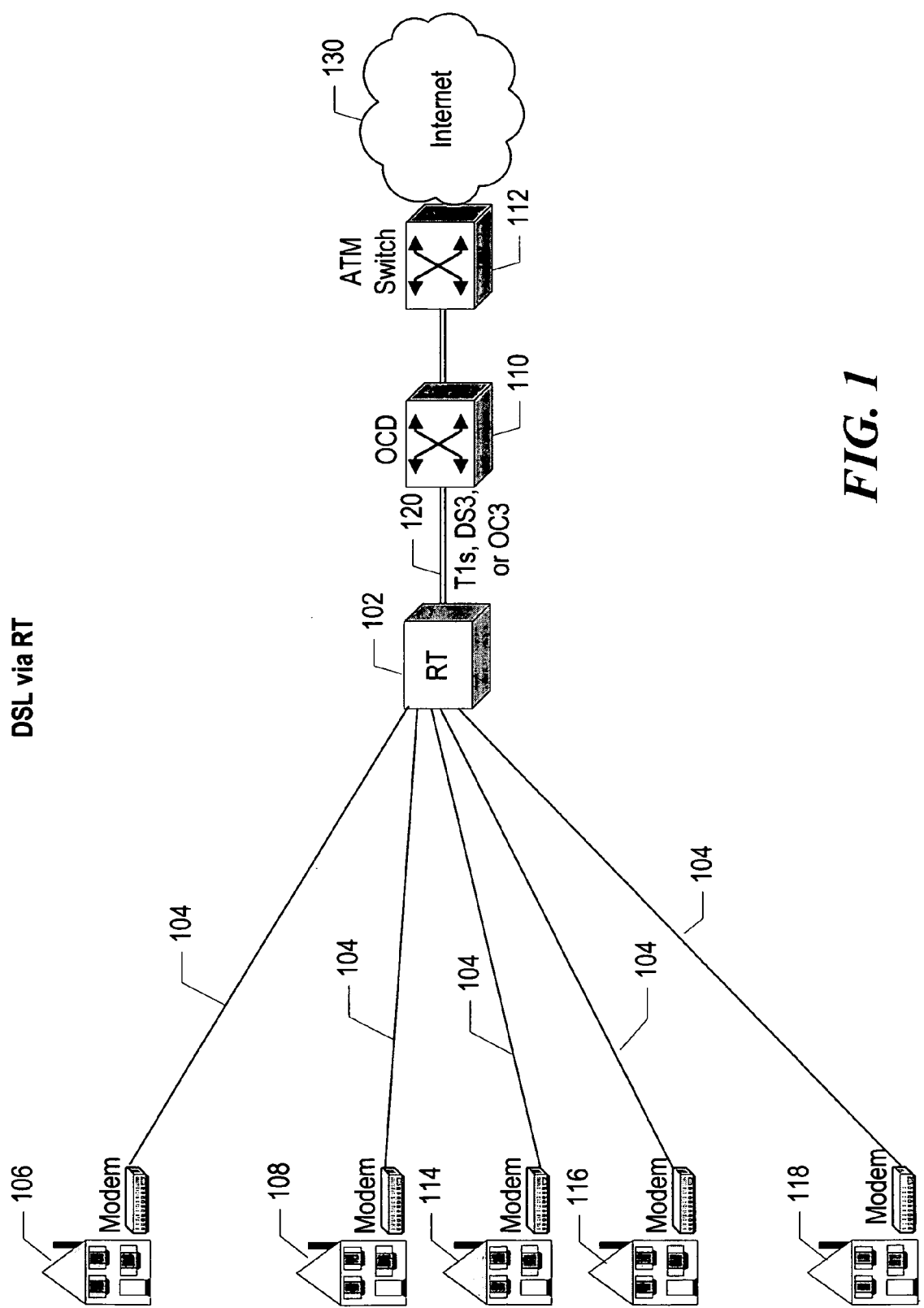
FIG. 1 is a general block diagram that illustrates a network with a remote terminal (RT) supporting residential subscribers.

Referring to FIG. 1, an illustrative communication system that includes DSL lines and backend data switches is shown. The system includes a remote terminal (RT) 102 connected remotely from an optical concentrator device (OCD) 110 via communication lines 120. The communication lines 120 may be T1 lines, DS3 lines, or OC3 lines as shown. The OCD 110 is coupled to an ATM switch 112, which in turn is connected to the internet 130. The remote terminal 102 supports a plurality of digital subscriber lines (DSL) 104 which are coupled to customer premise equipment at subscriber locations. Sample subscribers are illustrated as units 106, 108, 114, 116, and 118. An example of customer premises equipment includes a DSL modem as shown. Data received by the remote terminal 102 from the plurality of DSL lines 104 is concentrated and carried over the communication line 120 to the concentration device 110. Data is extracted from the concentration device and communicated in an asynchronous transfer mode (ATM) format to the ATM switch 112. Data in packet form is then carried over the internet 130. With the system shown with respect to FIG. 1, the number of DSL lines 104 that may be supported by a given remote terminal 102 needs to be determined prior to configuration to avoid overloading of the system. Thus, it would be desirable prior to configuration to determine the appropriate number of DSL lines that may be supported by the RT 102.

Figure 2:
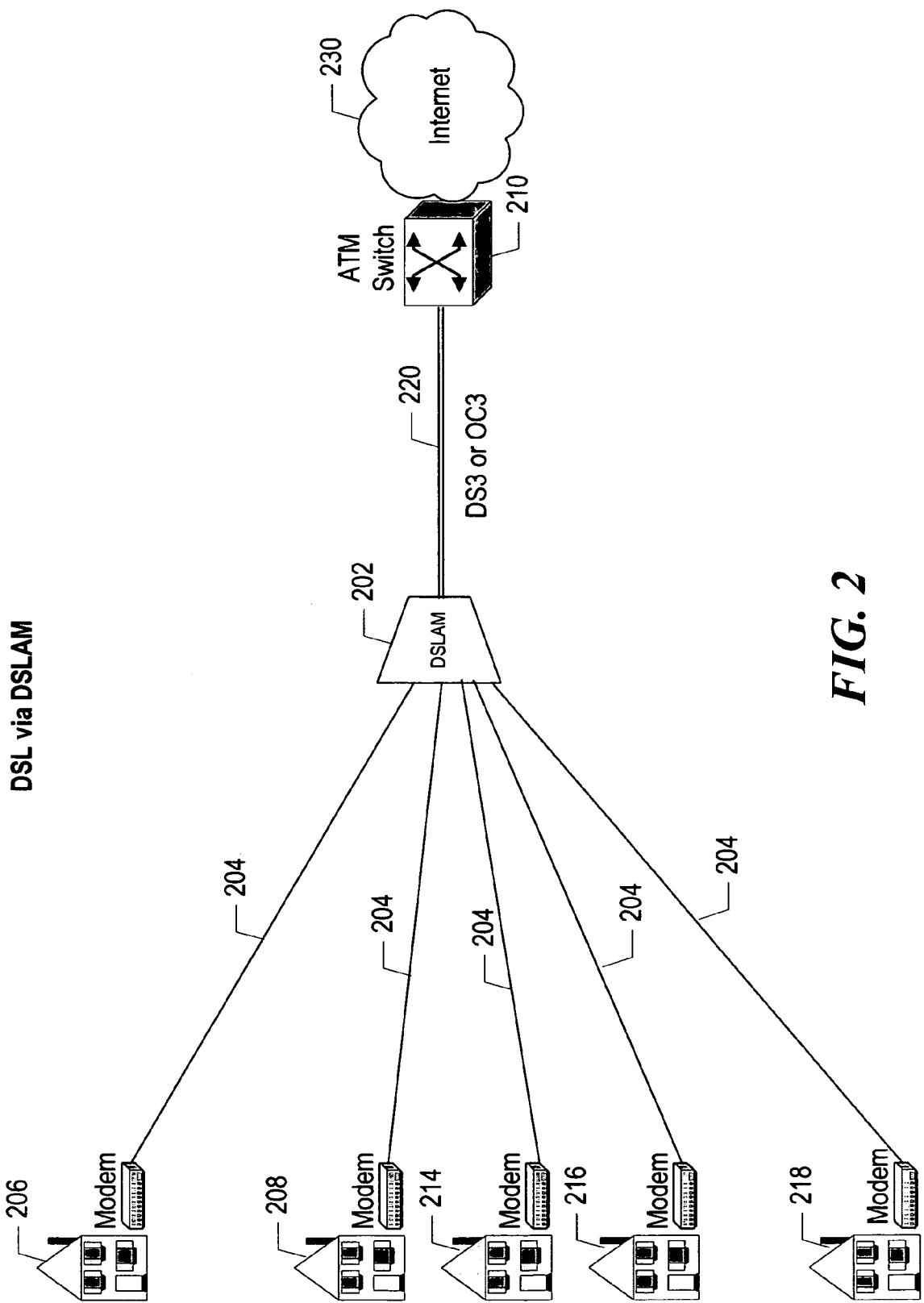
FIG. 2 is a general block diagram that illustrates a network with a DSLAM supporting residential subscribers.

Referring to FIG. 2, another example communication system that supports DSL lines and backend data traffic is shown. The system includes a plurality of DSL lines 204 supported by a digital subscriber line access multiplexer 202 (DSLAM). The DSLAM 202 is connected to ATM switch 210 via the communication link 220. An example of the communication link 220 is a DS3 or OC3 line. The ATM switch 210 is connected to the internet 230. The DSL lines 204 are connected to customer premise equipment at various subscriber locations as shown at 206, 208, 214, 216, 218. Prior to configuration of the DSL lines 204, it would be useful to determine an appropriate number of DSL lines that may be supported by the specific DSLAM 202. Information regarding the appropriate number of DSL lines may be used for system configuration.

Figure 3:
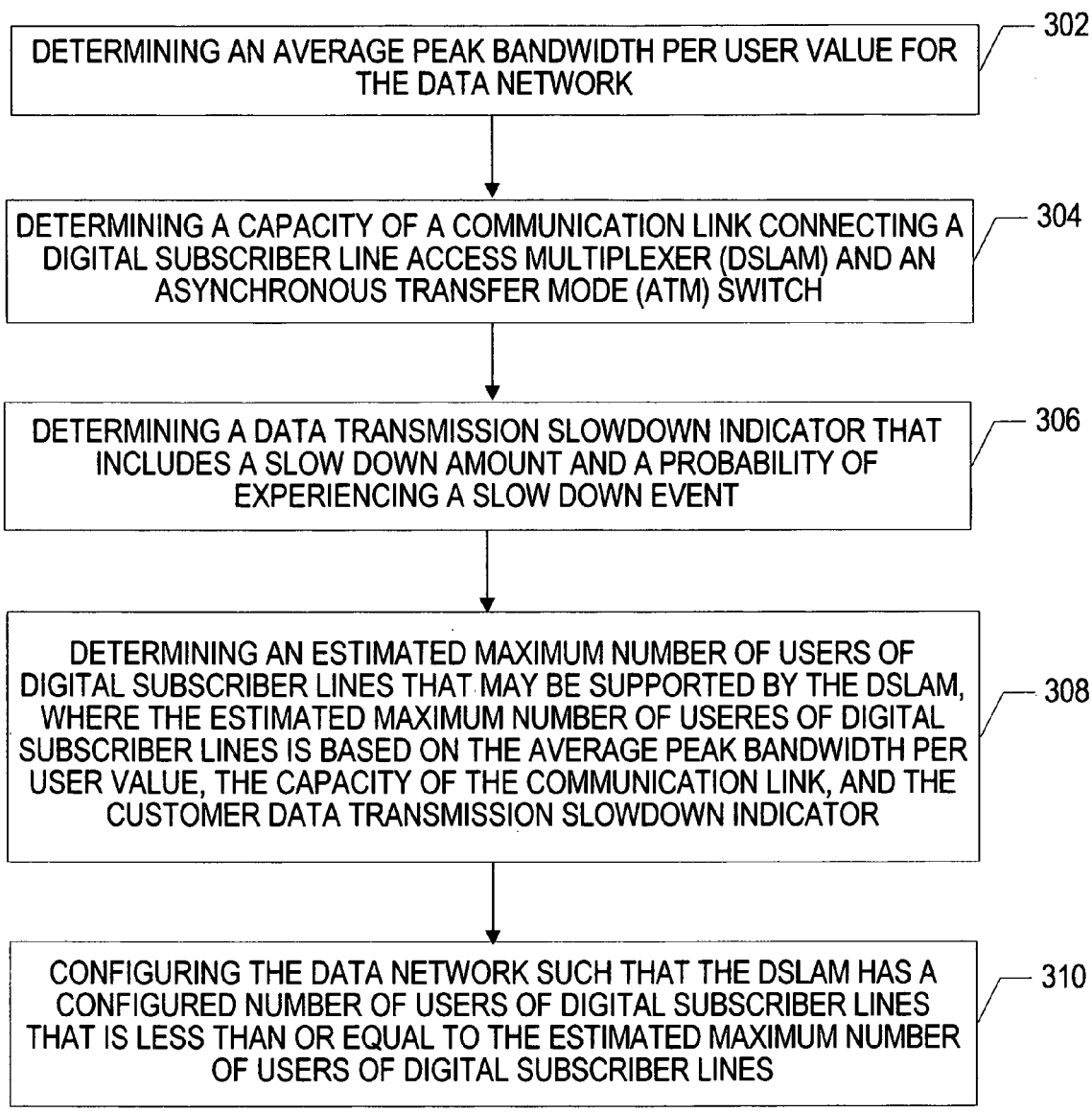
FIG. 3 is a flow chart that illustrates a method of estimating a maximum number of users of DSL lines supported by a DSLAM.

Referring to FIG. 3, a method of configuring a data network is illustrated. An average peak bandwidth is determined on a per user basis for the data network, as shown at 302. A capacity of a communication link is determined, at 304. The capacity of the communication link is for a DSLAM and a corresponding asynchronous mode (ATM) switch. A data transmission slowdown indicator is determined that includes a slowdown amount and a probability of experiencing a slowdown event, as shown at 306.

Based on the prior information, an estimated maximum number of users is determined corresponding with a maximum number of DSL lines that may be supported by the DSLAM, is shown at 308. The estimated maximum number of users of DSL lines is based on the average peak bandwidth per user value, the bandwidth capacity of a user, the capacity of the communication link, and the customer data transmission slowdown indicator. Once an estimated maximum number of users of DSL lines is determined, the data network may be configured such that the DSLAM has a configured number of users of DSL lines that is less than or equal to the estimated maximum number of users of DSL lines. This process step is shown at 310. Thus, after determining the estimated maximum number of DSL lines, DSLAM equipment may be configured to prevent overuse and traffic congestion of the DSL network. In addition, the DSLAM may be properly loaded to provide for increased traffic utilization, but not exceeding the estimated maximum number of lines.

Figure 4:
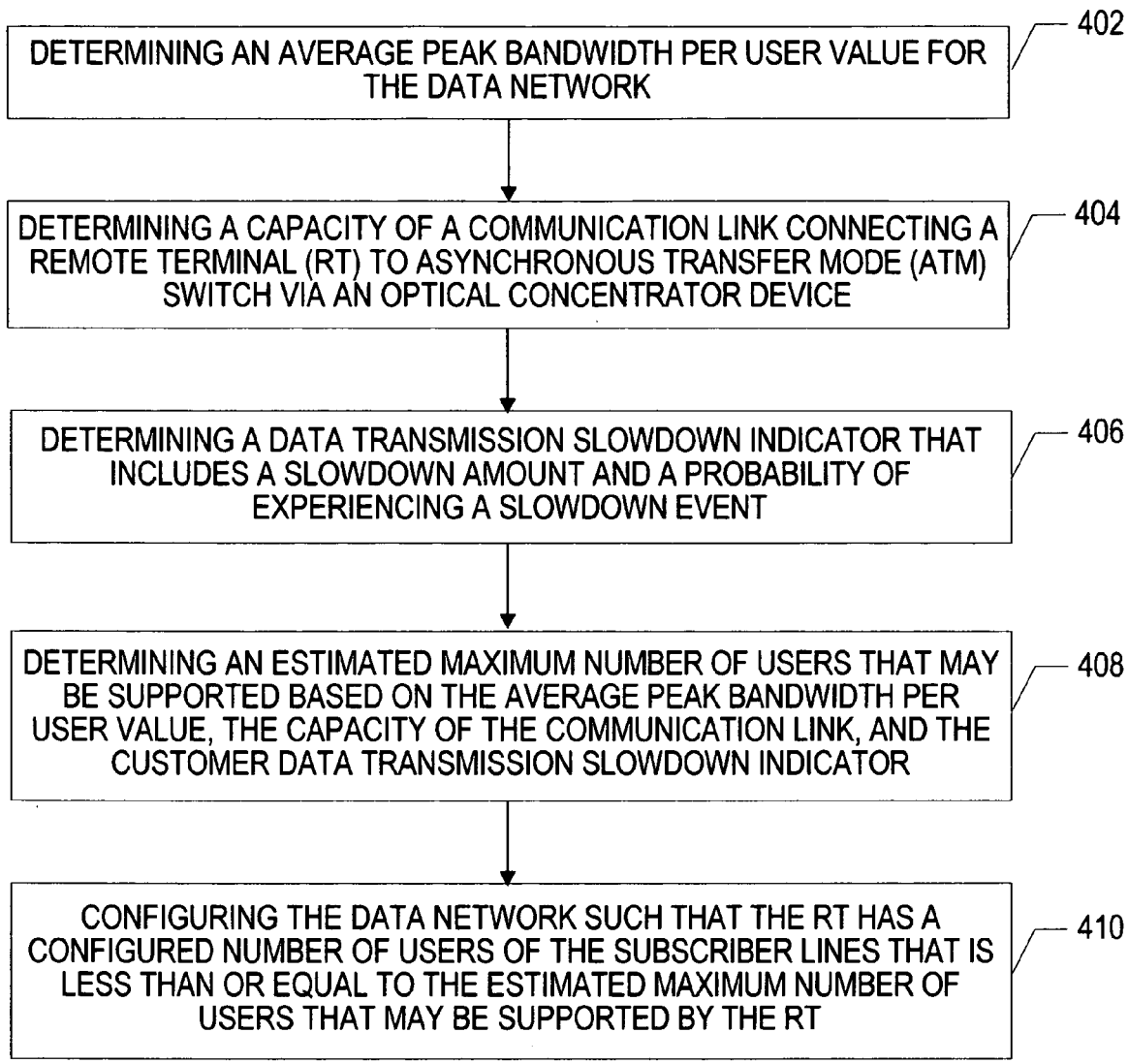
FIG. 4 is a flow chart that illustrates a method of estimating a maximum number of users of DSL lines supported by an RT unit.

Referring to FIG. 4, another method of configuring a data network is illustrated. An average peak bandwidth per user value is determined for the data network, at 402. A capacity of a communication link that connects a remote terminal (RT) to the ATM switch via an optical concentrator device is determined, at 404. A data transmission slowdown indicator is determined, at 406. The data transmission slowdown indicator includes a slowdown amount and a probability of experiencing a slowdown event that would cause a slowdown. Based on the average peak bandwidth per user value, the bandwidth capacity of a user, the capacity of the communication link, and the customer data transmission slowdown indicator, an estimated maximum number of users that may be supported by the remote terminal (RT) is determined, at 408. Once the estimated maximum number of users that may be supported by the RT is determined, the data network is configured such that the RT has a configured number of users that is less than or equal to the estimated maximum number of users. The data configuration step is shown at 410.

An example of an estimated maximum capacity model that may be used to calculate the estimated maximum capacity is now shown. For purposes of illustration, the bandwidth capacity of a remote terminal will be illustrated as the bandwidth B. The capacity of an individual user, which is the highest data transmission speed available to that user, will be labeled C. Typically, this individual user download speed for a DSL line is about 1.5 megabits per second. The average peak period bandwidth per customer will be indicated as A. This value is averaged over all customers in the network even those that are not currently logged in.

The number of servers will be determined as B/C. The total number of customers on an RT will be labeled PS for population size. The probability of a random user downloading at any given instant will be labeled U and is defined as A/C. A probability distribution labeled P is calculated as U/(1−U). This is substantially the same calculation utilized for telephone circuits based on an Erlang engineering distribution. P(n) is the probability of n customers actively downloading in a randomly chosen time.

With these variable definitions, the model formula is defined below:

$$F(0) = 1.$$
$$F(n) = \rho * F(n-1) * (P - (n-1))/n \quad \text{for } n < S.$$
$$F(n) = \rho * F(n-1) * (P - (n-1))/S \quad \text{for } S <= n <= PS$$
$$0 \quad \text{for } n > PS$$
$$p(0) = 1 \bigg/ \sum_{n=0}^{PS} F(n).$$
$$p(n) = F(n) * p(0).$$

A specific example with specific data filled in for a given remote terminal is now presented:

A rural RT is served by 2 T1 lines and has 20 customers all with a maximum download speed of 1.5 Mb/s and an average peak bandwidth of 50 kb/sec.

|  |  |  |  |
|---|---|---|---|
| B | 3072 | | |
| C | 1536 | | |
| A | 50 | | |
| S | 2 | | |
| PS | 20 | | |
| U | 0.0326 | | |
| D | 0.0336 | | |
| F(0) = | 1 | p(0) = | 50.54% |
| F(1) = | 0.672948 | p(1) = | 34.01% |
| F(2) = | 0.215108 | p(2) = | 10.87% |
| F(3) = | 0.065140 | p(3) = | 3.29% |
| F(4) = | 0.018630 | p(4) = | 0.94% |
| F(5) = | 0.005015 | p(5) = | 0.25% |
| F(6) = | 0.001266 | p(6) = | 0.06% |
| F(7) = | 0.000298 | p(7) = | 0.02% |
| F(8) = | 0.000065 | p(8) = | 0.00% |
| F(9) = | 0.000013 | p(9) = | 0.00% |
| F(10) = | 0.000002 | p(10) = | 0.00% |
| F(11) = | 0.000000 | p(11) = | 0.00% |
| F(12) = | 0.000000 | p(12) = | 0.00% |
| F(13) = | 0.000000 | p(13) = | 0.00% |
| F(14) = | 0.000000 | p(14) = | 0.00% |
| F(15) = | 0.000000 | p(15) = | 0.00% |
| F(16) = | 0.000000 | p(16) = | 0.00% |
| F(17) = | 0.000000 | p(17) = | 0.00% |
| F(18) = | 0.000000 | p(18) = | 0.00% |
| F(19) = | 0.000000 | p(19) = | 0.00% |
| F(20) = | 0.000000 | p(20) = | 0.00% |
| Sum | 1.978486 | Sum | 100.00% |

One way to engineer the RT is to ensure that customers experience a slowdown of no more then, say, 20%, no more than X % of the time. The tables below show the results for this example with X=1%, 5%, and 10%.

| | Ave Peak Period BW/Cust. in Kb/sec | | | |
|---|---|---|---|---|
| # of T1s | 30 | 40 | 60 | 100 |
| Probability of Slowdown in the Peak Period less than 1%. | | | | |
| 1 | 5 | 4 | 3 | 2 |
| 2 | 19 | 15 | 10 | 6 |
| 3 | 39 | 29 | 20 | 12 |
| 4 | 62 | 47 | 31 | 19 |
| 5 | 87 | 66 | 44 | 27 |
| 6 | 135 | 102 | 69 | 42 |
| 7 | 166 | 125 | 84 | 51 |
| 8 | 197 | 149 | 100 | 61 |
| Probability of Slowdown in the Peak Period less than 5%. | | | | |
| 1 | 12 | 9 | 6 | 4 |
| 2 | 33 | 25 | 17 | 10 |
| 3 | 60 | 45 | 30 | 19 |
| 4 | 90 | 58 | 45 | 28 |
| 5 | 122 | 92 | 62 | 37 |
| 6 | 176 | 132 | 89 | 54 |
| 7 | 211 | 159 | 107 | 65 |
| 8 | 248 | 187 | 125 | 76 |
| Probability of Slowdown in the Peak Period less than 10%. | | | | |
| 1 | 17 | 12 | 8 | 5 |
| 2 | 43 | 32 | 22 | 13 |
| 3 | 74 | 56 | 37 | 23 |
| 4 | 107 | 81 | 54 | 33 |
| 5 | 143 | 107 | 72 | 44 |

-continued

| | Ave Peak Period BW/Cust. in Kb/sec | | | |
|---|---|---|---|---|
| # of T1s | 30 | 40 | 60 | 100 |
| 6 | 198 | 149 | 100 | 61 |
| 7 | 237 | 178 | 120 | 73 |
| 8 | 276 | 208 | 139 | 85 |

In another embodiment, a method of estimation is provided that does not assume all customers have the same bandwidth. In this method customers can have different bandwith speeds. For DSL, the bandwidth speeds are integer multiples of the slowest speed. Below is an illustration:

B—The bandwidth capacity of an RT or DSLAM (referred to as RT hereafter) is the size of the "pipe" connecting the RT to the OCD. Typically, this will be a DS3 or an OC3, but may be a set of T1s in a rural RT setup.

$C_i$—Capacity of type i users. This is the highest download speed available to that user. This is considered constant for all type i users and must be an integer multiple of the $C_i$.

$A_i$—Average peak period bandwidth per customer for type i users. This is averaged over all type i customers, not just customers currently logged on.

S—Number of servers=$B/C_1$ (e.g., for a single DS3 with $C_1$=1536, this is 43,008/1,536=28). This must be rounded to an integer.

$R_i$—Ratio of $C_i/C_1$.

$P_i$—Total number of type i customers on the RT.

$U_i$—Probability of a random type i user downloading at any instant=$A_i/C_i$.

$\rho_i$—Rho=$U_i/(1-U_i)$ (this is equivalent to $\lambda/\mu$ in an Erlang or Engset distribution).

k—number of different types of customers.

$p(n_1, n_2, \ldots, n_k)$ probability of $n_1$ customers of type 1 and $n_2$ customers of type 2, ..., $n_k$ customers of type k actively downloading at any randomly chosen time in the peak period.

The model works like this:

$$F(0, 0, \ldots, 0) = 1.$$

$$F(n_1,\ldots,n_j,\ldots,n_k) = \rho_j * F(n_1,\ldots,n_{j-1},\ldots,n_k)*(P_j - (n_j - 1))/n \quad \text{for } \sum_{i=1}^{k} n_i * R_i < S.$$

$$F(n_1,\ldots,n_j,\ldots,n_k) = \rho_j * F(n_1,\ldots,n_{j-1},\ldots,n_k)*(P_j - (n_j - 1))/S \quad \text{for } S <= \sum_{i=1}^{k} n_i * R_i \text{ and } n_j <= P_j.$$

$$F(n_1,\ldots,n_j,\ldots,n_k) = 0 \quad \text{for } n_j > P_j.$$

$p(0, \ldots 0)=1/\Sigma F(n_1, \ldots, n_j, \ldots, n_k)$. Where the sum is over all values of $(n_1, \ldots, n_j, \ldots, n_k)$.

$p(n_1, \ldots, n_j, \ldots, n_k)=F(n_1, \ldots, n_j, \ldots, n_k)*p(0, \ldots 0)$.

EXAMPLE

A rural RT is served by 4 T1 lines and has 15 customers with a maximum download speed of L536M and an average peak bandwidth of 50 kb/sec and 5 customers with a maximum download speed of 6.144M and an average peak bandwidth of 100 kb/sec.

| | B | 6144 |
|---|---|---|
| | S | 4 |
| | Type 1 | Type 2 |
| C | 1536 | 6144 |
| A | 50 | 100 |
| P | 15 | 5 |
| U | 0.0326 | 0.0163 |
| P | 0.0336 | 0.0165 |

F(type1, type2)

| | Type 2 Customers | | | | | |
|---|---|---|---|---|---|---|
| Type I Customers | 0 | 1 | 2 | 3 | 4 | 5 |
| 0 | 1.000000 | 0.082727 | 0.005475 | 0.000272 | 0.000009 | 0.000000 |
| 1 | 0.504711 | 0.052191 | 0.003886 | 0.000209 | 0.000007 | 0.000000 |
| 2 | 0.118875 | 0.014751 | 0.001220 | 0.000071 | 0.000003 | 0.000000 |
| 3 | 0.017333 | 0.002509 | 0.000228 | 0.000014 | 0.000001 | 0.000000 |
| 4 | 0.001750 | 0.000289 | 0.000029 | 0.000002 | 0.000000 | 0.000000 |
| 5 | 0.000162 | 0.000030 | 0.000003 | 0.000000 | 0.000000 | 0.000000 |
| 6 | 0.000014 | 0.000003 | 0.000000 | 0.000000 | 0.000000 | 0.000000 |
| 7 | 0.000001 | 0.000000 | 0.000000 | 0.000000 | 0.000000 | 0.000000 |
| 8 | 0.000000 | 0.000000 | 0.000000 | 0.000000 | 0.000000 | 0.000000 |
| 9 | 0.000000 | 0.000000 | 0.000000 | 0.000000 | 0.000000 | 0.000000 |
| 10 | 0.000000 | 0.000000 | 0.000000 | 0.000000 | 0.000000 | 0.000000 |
| 11 | 0.000000 | 0.000000 | 0.000000 | 0.000000 | 0.000000 | 0.000000 |
| 12 | 0.000000 | 0.000000 | 0.000000 | 0.000000 | 0.000000 | 0.000000 |
| 13 | 0.000000 | 0.000000 | 0.000000 | 0.000000 | 0.000000 | 0.000000 |
| 14 | 0.000000 | 0.000000 | 0.000000 | 0.000000 | 0.000000 | 0.000000 |
| 15 | 0.000000 | 0.000000 | 0.000000 | 0.000000 | 0.000000 | 0.000000 | p(type 1,type2)

| Type 1 Customers | Type 2 Customers | | | | | |
|---|---|---|---|---|---|---|
| | 0 | 1 | 2 | 3 | 4 | 5 |
| 0 | 55.35% | 4.58% | 0.30% | 0.02% | 0.00% | 0.00% |
| 1 | 27.93% | 2.89% | 0.22% | 0.01% | 0.00% | 0.00% |
| 2 | 6.58% | 0.82% | 0.07% | 0.00% | 0.00% | 0.00% |
| 3 | 0.96% | 0.14% | 0.01% | 0.00% | 0.00% | 0.00% |
| 4 | 0.10% | 0.02% | 0.00% | 0.00% | 0.00% | 0.00% |
| 5 | 0.01% | 0.00% | 0.00% | 0.00% | 0.00% | 0.00% |
| 6 | 0.00% | 0.00% | 0.00% | 0.00% | 0.00% | 0.00% |
| 7 | 0.00% | 0.00% | 0.00% | 0.00% | 0.00% | 0.00% |
| 8 | 0.00% | 0.00% | 0.00% | 0.00% | 0.00% | 0.00% |
| 9 | 0.00% | 0.00% | 0.00% | 0.00% | 0.00% | 0.00% |
| 10 | 0.00% | 0.00% | 0.00% | 0.00% | 0.00% | 0.00% |
| 11 | 0.00% | 0.00% | 0.00% | 0.00% | 0.00% | 0.00% |
| 12 | 0.00% | 0.00% | 0.00% | 0.00% | 0.00% | 0.00% |
| 13 | 0.00% | 0.00% | 0.00% | 0.00% | 0.00% | 0.00% |
| 14 | 0.00% | 0.00% | 0.00% | 0.00% | 0.00% | 0.00% |
| 15 | 0.00% | 0.00% | 0.00% | 0.00% | 0.00% | 0.00% |

This model allows different types of customers to have different bandwidth speeds and also for different types of customers to have different average peak period bandwidth. This allows capacity questions to be analyzed under more realistic conditions than previously available. For example, 6 Mb/s links can use up the capacity of RTs that have only a few T1s of total capacity. Therefore, being able to accurately analyze the impact of adding these customers to 1.5 Mb/s customers is important in setting capacity. Also, one might want to assume that the 6 Mb/s customers have a different average peak period bandwidth when analyzing even large capacity DSLAMs and RTs.

An example of how this model can be used in practice follows: Suppose type 1 customers have 1.5 Mb/s capacity and an average peak period bandwidth of 20 kb/sec. Type 2 customers have 6 Mb/s capacity and an average bandwidth of 35 kb/sec. If we estimate that the type 2 customers will be 10% of the total customer base, the model as described can be used to calculate the capacity of an RT in the following way. With this assumption, 90% of the customers are assumed to be type 1 customers. The probability of slowdown of at least x % is calculated for some (0.9*N) type 1 customers and (0.1* N) type 2 customers. N is increased or decreased until the largest value of N is found where the probability of slowdown is at least x % less than a desired threshold. One can also vary the percentage of type 2 customers, repeat the process, and observe the impact of the percentage of type 2 customers on the capacity of the RT.

Figure 5:
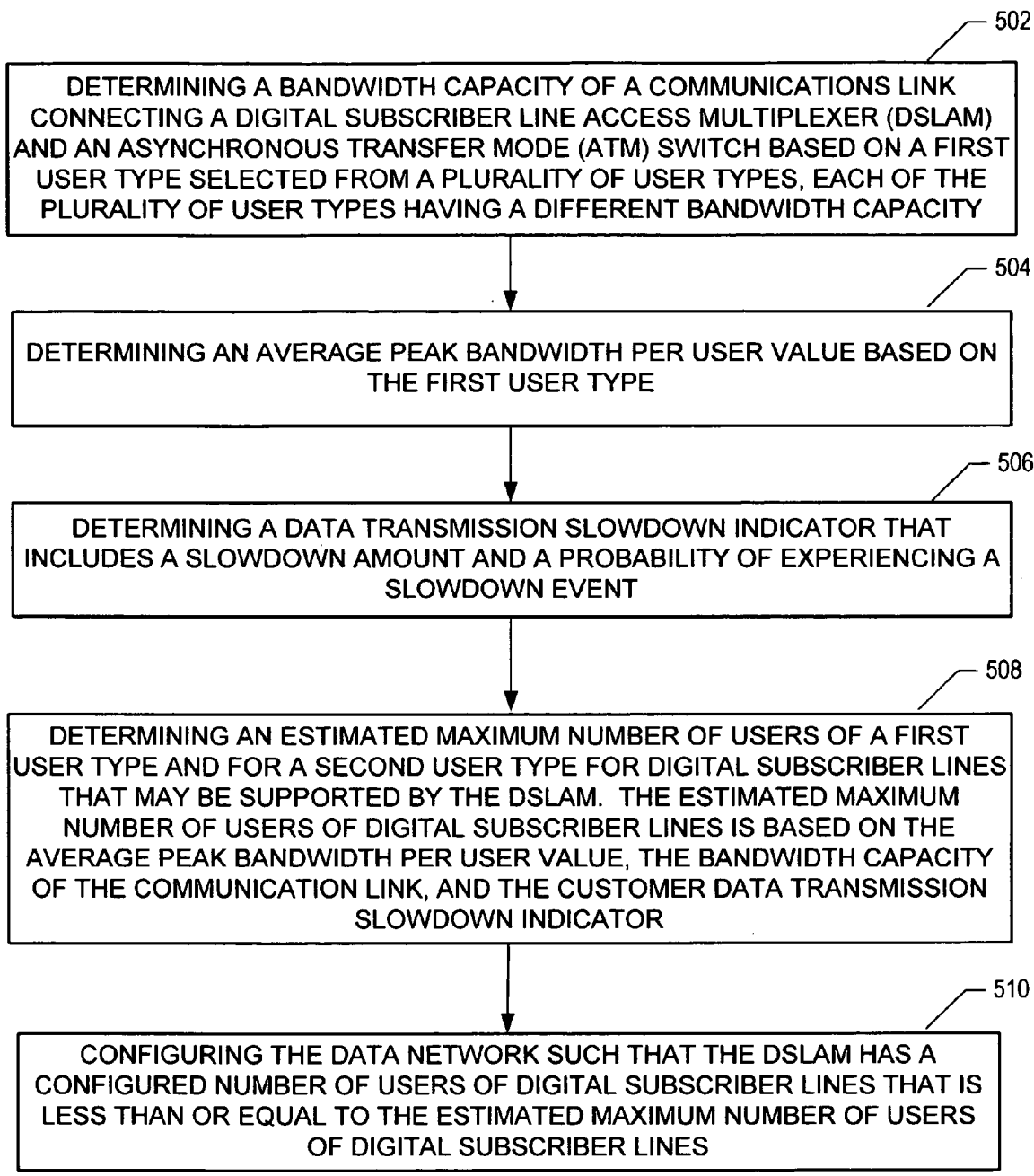
FIG. 5 is a flow chart that illustrates another method of estimating a maximum number of users of DSL lines.

Referring to FIG. 5, a method of estimating capacity is disclosed. A bandwidth capacity of a communications link that connects a DSLAM and an ATM switch is determined, at 502. The estimated capacity is based on a first user type that is selected from a set of available user types. Each of the set of user types has a different and constant assumed bandwidth. For example, a first user type may have a bandwidth of 1.5 MB/s and a second user type may have a bandwidth of 6 Mb/s. An average peak bandwidth per user value is determined based on the first user type, at 504. While the first user type is described, it should be understood that a second, third or any particular number of user types may be defined and selected depending on the particular implementation and network. A data transmission slowdown indicator is determined at 506. The slowdown indicator includes a slowdown amount and an estimated possibility of experiencing a slowdown event. Based on the average peak bandwidth per user value, the bandwidth capacity of the link, and the transmission slowdown indicator for the particular customer with the selected user type, an estimated maximum number of users of a first user type and for a second user type of DSL lines is determined, at 508. The above described formulas and computation methods may be used to determine this estimated maximum number of users for different user types. At 510, a data network is configured such that the DSLAMs in the network support a number of DSL user that is less than or equal to the estimated maximum number of users.

The above disclosed methods and models provide an improved estimate for the number of customers that may be served by a given capacity communication link. This estimate is useful for configuration of data networks as illustrated. The methods may be implemented by use of a spreadsheet program on a personal computer. In addition, the models have wide applicability and may be useful for telecommunications providers to determine the amount of bandwidth needed to provide a given service. Similarly, suppliers of switching equipment may use the models to assist their customers to properly size deployed networks.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of configuring a data network, the method comprising:
   determining a bandwidth capacity of a communications link connecting a digital subscriber line access multiplexer (DSLAM) and an asynchronous transfer mode (ATM) switch based on a first user type selected from a plurality of user types, each of the plurality of user types having a different bandwidth capacity;
   determining an average peak bandwidth per user value based on the first user type;
   determining a data transmission slowdown indicator that includes a slowdown amount and a probability of experiencing a slowdown event;
   determining an estimated maximum number of users of the first user type for digital subscriber lines that may be supported by the DSLAM, where the estimated maximum number of users of digital subscriber lines is based on the average peak bandwidth per user value, the bandwidth capacity of the communication link, and the customer data transmission slowdown indicator; and
   configuring the data network such that the DSLAM has a configured number of users of digital subscriber lines that is less than or equal to the estimated maximum number of users of digital subscriber lines.

2. The method of claim 1, wherein the estimated maximum number of users of digital subscriber lines is further based on a probability of a random user downloading data at a given period of time.

3. The method of claim 1, wherein the estimated maximum number of users of digital subscriber lines is further based on an Erlang model calculation.

4. The method of claim 1, wherein the communication link is one or more Digital Signal-level 3 (DS3) type communication links or an Optical Carrier-level 3 (OC3) type communication link.

5. The method of claim 1, wherein the estimated maximum number of users of digital subscriber lines is calculated with an assumption of a first data transfer speed associated with a first set of users and a second data transfer speed associated with a second set of users, the second data transfer speed different than the first data transfer speed.

6. The method of claim 5, wherein the first data transfer speed is about 1.5 Mbits/second and wherein the second data transfer speed is at least one of an integer multiple of 1.5 Mbits/second, an integer multiple of 384 kb/second, or an integer multiple of 192 kb/second.

7. A method of configuring a data network, the method comprising:
   determining a user type selected from a set of available user types, each of the available user types associated with a different bandwidth capacity;
   determining an average peak bandwidth per user value for the data network and based on the user type;
   determining a capacity of a communication link connecting a remote terminal (RT) to asynchronous transfer mode (ATM) switch via an optical concentrator device, the capacity based on the bandwidth capacity associated with the user type;
   determining a data transmission slowdown indicator that includes a slowdown amount and a probability of experiencing a slowdown event;
   determining an estimated maximum number of users that may be supported by the RT, where the estimated maximum number of users is based on the average peak bandwidth per user value, the capacity of the communication link, and the data transmission slowdown indicator; and
   configuring the data network such that the RT has a configured number of users of subscriber lines that is less than or equal to the estimated maximum number of users that may be supported by the RT.

8. The method of claim 7, wherein the communication link comprises a plurality of T1 transmission lines.

9. The method of claim 7, wherein the communication link comprises one of an Optical Carrier-level 3 (OC3) and one or more Digital Signal-level 3 (DS3) links.

10. A data communications system comprising:
   a plurality of digital subscriber lines;
   a digital subscriber line multiplexer coupled to each of the plurality of digital subscriber lines; and
   a data switch coupled to the digital subscriber line multiplexer via a communication link;
   wherein the data communications system is configured such that the number of digital subscriber line users supported by the digital subscriber line multiplexer is determined based on an estimated maximum number of users, the estimated maximum number of users determined based on an average peak bandwidth per user value, a data communication capacity of the communication link, and a data transmission slowdown indicator, wherein the data communication capacity is determined based on a type of user selected from a set of available user types.

11. The data communication system of claim 10, wherein one of the user types in the set of available user types has a lowest capacity value and wherein each of the other user types in the set of available user type has a capacity that is an integer multiple of the lowest capacity value.

12. A data communications system comprising:
   a plurality of digital subscriber lines;
   a remote terminal device coupled to each of the plurality of digital subscriber lines; and
   a data switch coupled to the remote terminal device via a communication link;
   wherein the data communications system is configured such that the number of digital subscriber line users supported by the remote terminal device is determined based on an estimated maximum number of users, the estimated maximum number of users determined based on an average peak bandwidth per user value, a data communication capacity of the communication link, and a data transmission slowdown indicator, wherein the data communication capacity is determined based on a type of user selected from a set of available user types.

13. The system of claim 12, wherein the estimated maximum number of users of digital subscriber lines is further based on a probability of a random user downloading data at a given period of time.

14. The system of claim 12, wherein the estimated maximum number of users of digital subscriber lines is further based on an Erlang model calculation.

15. The system of claim 12, wherein the communication link is one or more Digital Signal-level 3 (DS3) type communication links, an Optical Communication Level 3 (OC3) type communication link, or one or more T1 type communication links.

16. The system of claim 12, wherein the estimated maximum number of users of digital subscriber lines is calculated with an assumption that a plurality of different users having the same user type download data at the same data transfer speed.

17. The system of claim 16, wherein the data transfer speed for the user type is about 1.5 Mbits/second.

18. They system of claim 16, where in the data transfer speed for the user type is about 384 kb/second.

19. The system of claim 16, wherein the data transfer speed for the user type is about 192 kb/second.

20. The system of claim 1, wherein the estimated maximum number of users of digital subscriber lines is calculated with an assumption that the probability of experiencing a slowdown event is less than 10%.

21. The system of claim 1, wherein die estimated maximum number of users of digital subscriber lines is calculated with an assumption that the probability of experiencing a slowdown event is less than 5%.

22. The system of claim 1, wherein the estimated maximum number of users of digital subscriber lines is calculated with an assumption tat the probability of experiencing a slowdown event is less than 1%.

23. The system of claim 4, wherein the second data transfer speed is an integer multiple of the first data transfer speed.

24. The system of claim 1, wherein each of the plurality of user types has a different average peak period bandwidth per user value.

* * * * *